United States Patent
Northup (10) Patent No.: US 8,813,240 B1
(45) Date of Patent: Aug. 19, 2014

(54) DEFENSIVE TECHNIQUES TO INCREASE COMPUTER SECURITY

(75) Inventor: Eric R. Northup, Seattle, WA (US)

(73) Assignee: Google Inc., Mountain View, CA (US)

( * ) Notice: Subject to any disclaimer, the term of this patent is extended or adjusted under 35 U.S.C. 154(b) by 86 days.

(21) Appl. No.: 13/483,880

(22) Filed: May 30, 2012

(51) Int. Cl.
- *G06F 7/00* (2006.01)
- *G06F 21/55* (2013.01)
- *G06F 17/30* (2006.01)
- *H04N 7/16* (2011.01)

(52) U.S. Cl.
CPC .................................... *G06F 21/554* (2013.01)
USPC .................... 726/26; 726/22; 726/25; 726/29

(58) Field of Classification Search
CPC ................................................... G06F 21/554
See application file for complete search history.

(56) References Cited

U.S. PATENT DOCUMENTS

| | | | |
|---|---|---|---|
| 7,673,113 B2 | 3/2010 | Sugumar | |
| 2002/0140471 A1 | 10/2002 | Fiscus | |
| 2004/0128549 A1 | 7/2004 | Poisner | |
| 2007/0079307 A1 | 4/2007 | Dhawan | |
| 2009/0222558 A1* | 9/2009 | Xu et al. | 709/224 |
| 2010/0031345 A1 | 2/2010 | Sinclair | |
| 2010/0132016 A1 | 5/2010 | Ferris | |
| 2012/0084774 A1 | 4/2012 | Post | |
| 2012/0089981 A1* | 4/2012 | Tripathi | 718/1 |
| 2012/0131302 A1 | 5/2012 | Nasu | |
| 2012/0159634 A1* | 6/2012 | Haikney et al. | 726/25 |
| 2012/0226866 A1 | 9/2012 | Bozek | |
| 2013/0074181 A1* | 3/2013 | Singh | 726/22 |
| 2013/0117801 A1* | 5/2013 | Shieh et al. | 726/1 |
| 2013/0212709 A1* | 8/2013 | Tucker | 726/29 |

* cited by examiner

*Primary Examiner* — Shin-Hon Chen
(74) *Attorney, Agent, or Firm* — Fish & Richardson P.C.

(57) ABSTRACT

Among other disclosed subject matter, a computer-implemented method includes executing a plurality of virtual machines on a physical machine, wherein a first virtual machine of the plurality of virtual machines executes an encryption process. Execution of a hostile process that is configured to compromise the encryption process is detected, wherein the hostile process executes in a second virtual machine of the plurality of virtual machines. Migrating at least the second virtual machine to a different second physical machine based on the detection of the execution of the hostile process.

28 Claims, 4 Drawing Sheets

DEFENSIVE TECHNIQUES TO INCREASE COMPUTER SECURITY

BACKGROUND

This specification relates to computer security.

Cloud computing is network-based computing in which typically large collections of servers housed in data centers or "server farms" provide computational resources and data storage as needed to remote end users. Some cloud computing services allow end users to execute software applications in virtual machines. For example, an operator of the cloud computing service can allow users to rent, lease or otherwise use virtual machines hosted on the operator's physical machines (e.g., the collection of servers). Users can execute various applications on the virtual machines. For example, a user can execute encryption algorithms/applications (e.g., password encryption schemes, data encryption schemes, user authentication algorithms, etc.) or other security applications.

Some users may execute malicious software applications or processes (e.g., malware, viruses, etc.) that attempt to compromise processes executing on other virtual machines hosted on the same physical machine. For example, a malicious process can perform a side-channel attack of a first virtual machine to compromise an encryption process executing on a second virtual machine that is hosted on the same physical machine. As another example, a malicious process can perform a statistical keystroke analysis attack and attempt to gather information entered from the keyboard based on elapsed times between keystrokes that can be used to predict character combinations. As a third example, a malicious process can perform a covert channel attack that involves two or more virtual machines that are isolated from each other (e.g., cannot communicate with one another) and use subtle variations in events that perturb the physical machine (e.g., disk accesses or accessing a shared resource that can only be accessed by a one virtual machine at a time) as a medium to communicate information.

SUMMARY

This specification describes technologies relating to defensive techniques for improving computer security. The system can monitor a virtual machine's clock accesses and determine whether the number of clock accesses exceeds a threshold. If the number of clock accesses exceeds the threshold, the system can determine that the virtual machine is executing a malicious process (e.g., a side channel attack). The system can then limit the virtual machine's ability to access the clock. For example, the system can limit the frequency at which the virtual machine accesses the clock. In addition, the system can migrate one or more of the virtual machines hosted on the physical machine to a different physical machine. The system can migrate the virtual machines one at a time.

In general, one aspect of the subject matter described in this specification can be embodied in methods that include the actions of executing a plurality of virtual machines on a first physical machine, wherein a first virtual machine of the plurality of virtual machines executes an encryption process; detecting, on a second virtual machine of the plurality of virtual machines, execution of a hostile process that is configured to compromise the encryption process; and migrating at least the second virtual machine from the first physical machine to a second physical machine based on the detection of the execution of the hostile process, wherein the second physical machine is separate and distinct from the first physical machine. Other embodiments of this aspect include corresponding systems, apparatus, and computer programs.

These and other aspects can optionally include one or more of the following features. Detecting the execution of the hostile process can comprise: determining a count representing accesses to a clock by the hostile process, wherein the clock is within a central processing unit of the physical machine; determining whether the count is beyond a threshold; and detecting the execution of the hostile process based on the determination that the count is beyond the threshold. Migrating at least the second virtual machine can comprise migrating the first virtual machine to a third physical machine. Migrating at least the second virtual machine can comprise migrating the first virtual machine to the second physical machine at a time instance that is different than a time instance of migrating the second virtual machine. The second physical machine may not be hosting a virtual machine executing an encryption process. The hostile process can be configured to monitor events associated with the first virtual machine to determine a cryptographic key associated with the encryption process. The events associated with the first virtual machine can include cache accesses. The cache accesses can be associated with a cache associated with the physical machine. The process configured to compromise the encryption process can comprise a side-channel attack. A processing load associated with the second physical machine can be less than a load threshold before migrating the second virtual machine.

Particular embodiments of the subject matter described in this specification can be implemented so as to realize one or more of the following advantages. For example, network and computer security can be increased by preventing a hostile software application or malware from compromising encryption/cryptographic processes executed on a virtual machine or executed by the physical machine (e.g., the host machine). Another possible advantage is computer security can be increased by protecting other processes or applications from hostile software applications that rely on access to precise timing information. For example, covert channel attacks and statistical keystroke analysis can rely on precise timing information and can be thwarted. In addition, the security of a user account or data associated with a user account can be increased.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
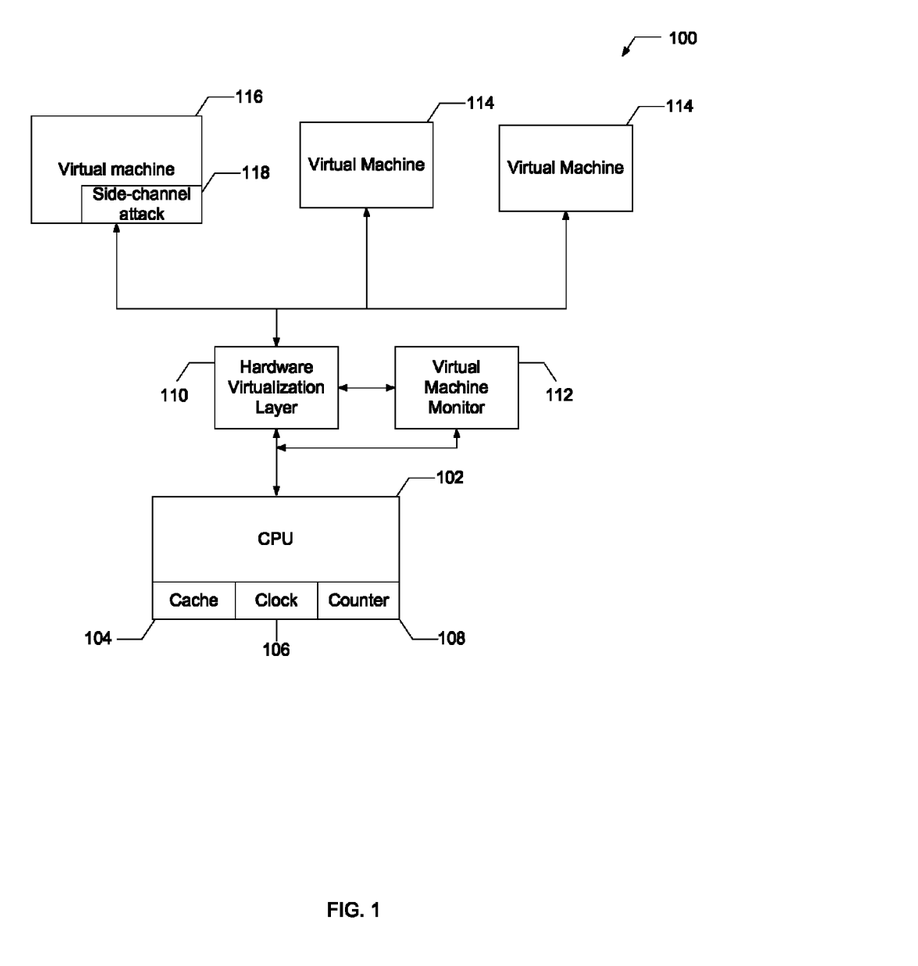
FIG. 1 illustrates an example system to improve computer security.

FIG. 1 illustrates an example system for improving computer security. The system includes a physical machine 100.

The physical machine 100 can be a computer, server or a collection of data processing apparatuses and can be part of a cloud computing system. The physical machine 100 can include a Central Processing Unit (CPU) 102 that includes a cache 104, a clock 106, a counter 108, a hardware virtualization module 110, a virtual machine monitor 112, virtual machines 114 and 116 and a malicious or hostile software application 118 executed on virtual machine 116. Although not illustrated, the system can include multiple physical machines 100.

The CPU 102 can be various types of computer processors. For example, the CPU 102 can be similar to an x86 processor, an x86 compatible processor or a 64 bit descendant of the x86 processor (e.g., Intel Core 2 processor or AMD Opteron processor). Other CPUs can be used.

The CPU 102 can include a cache 104 (e.g., a data cache). For example, the cache 104 can be a memory module that stores data and provides for fast memory accesses. In some implementations, the cache 104 includes several levels of cache (e.g., L1 and L2 cache). The CPU 102 can use the cache to store data that was recently used by a process executed on the virtual machine. For example, the cache 104 can store values recently used in an encryption algorithm (e.g., intermediate calculations or cryptographic key information).

The CPU 102 can also include one or more clocks 106. For example, the CPU 102 can include one or more high precision clocks (e.g., nanosecond or faster clocks) that provide information associated with the CPU timing. For example, the CPU 102 can include a time stamp counter that counts the number of ticks since the CPU 102 was reset. In addition, the CPU 102 can include other clocks. For example, the CPU 102 can include a real time clock, a high precision event timer or a power management timer. The clocks 106 can include clock sources (e.g., a real time clock) or timer sources (e.g., the time stamp counter). Each of the clocks 106 can be accessed by the physical machine 100, the virtual machine monitor 112, a virtual machine 114 and 116 and/or a process executed on the virtual machines 114 and 116. For example, in some implementations, the virtual machine 114 can access a clock 106 using an Application Programming Interface ("API") associated with the CPU 102 and/or an operating system executing on the physical machine 100. In some implementations, the one or more clocks 106 are also included in a peripheral device (e.g., a graphics processing unit).

Each of the clocks 106 can be associated with a counter 108 that stores the number of times the respective clock 106 has been accessed. Alternatively, the counter 108 stores the rate of access of the clock 106 (e.g., the number of times the clock 106 has been accessed in a time period divided by the length of the time period). For example, a time stamp counter can store the number of times the time stamp clock is accessed. After each time the time stamp clock is read, the time stamp counter can be incremented. The counter 108 can be accessed by the virtual machine monitor 112 using an API (e.g., READ_TSC) associated with the CPU 102 or an operating system executed on the physical machine 100. For ease of discussion, it will be assumed that the CPU 102 includes a single clock 106 and a counter 108 associated with the clock 106.

The hardware virtualization module 110 can be used to implement virtual devices. For example, in some implementations, the hardware virtualization module 110 can include a virtualization component, e.g., a Kernel-based Virtualization Machine, and a processor emulator, e.g., QEMU, to virtualize and emulate hardware devices, such as virtual machines 114 and 116.

The hardware virtualization module 110 can be associated with a virtual machine monitor 112 (e.g., a hypervisor). The virtual machine monitor 112 can manage the execution of the virtual machines 114 and 116 executed on the physical machine 100. The virtual machine monitor 112 can migrate or relocate the virtual machines 114 and 116 from the physical machine 100 to a different physical machine. For example, the virtual machine monitor 112 can migrate each of the virtual machines 114 and 116 from the physical machine 100 one at the same time or at different times. In some implementations, migrating a virtual machine is accomplished by saving the virtual machine's state on the original physical machine, and then restoring it on the new physical machine. By relocating virtual machines 114 one at a time, the virtual machine monitor 112 can reduce the likelihood that a hostile application will be able to compromise an encryption process executed on a virtual machine hosted on the physical machine 100.

The virtual machines 114 and 116 can be a hardware virtualization of a physical machine (e.g., a computer or server). For example, the virtual machines 114 and 116 can be a virtualized computer that includes an operating system (e.g., a guest operating system) and a software application. The virtual machines 114 and 116 can be associated with an end user. For example, the virtual machine 114 can be assigned to or be associated with an end user of the system (e.g., a user that rents or purchases computing resources from the operator of a cloud computing system). The end user can host various data and/or software applications on the virtual machines 114 and 116. In addition, the end user can execute various applications on the virtual machine 114 and 116. For example, a user can execute an encryption algorithm or process associated with a website hosted on the virtual machine 114. In some implementations, the encryption algorithm (e.g., Advanced Encryption Standard or Data Encryption Standard) can be used to encrypt or otherwise protect data (e.g., a password, user account information, credit card information, etc.). In some implementations, the encryption algorithm encodes communications and data exchanges (e.g., a Secure Sockets Layer ("SSL") or a Transport Layer Security ("TSL")). In addition, a second user can execute a malicious process or application (e.g., the side-channel attack 118) on the virtual machine 116 that attempts to compromise the cryptographic keys associated with the encryption algorithm. The side-channel attack 118 can attempt to use information associated with the cryptographic calculations to compromise the encryption algorithm. For example, the side-channel attack 118 can monitor cache accesses and attempt to deduce the cryptographic key using timing information associated with the encryption algorithm (e.g., how much time the encryption algorithm takes to perform computations and access the CPU cache 104).

The virtual machines 114 and 116 can access hardware resources associated with the physical machine 100. For example, the virtual machines 114 and 116 can read the clock 106 using an API associated with the CPU 102 and/or an operating system executed on the physical machine 100. In some implementations, the virtual machine monitor 112 can act as an intermediary between the virtual machines 114 and 116 and the physical machine 100. For example, in some implementations, when an application executed on the virtual machine 114 uses an API to interact with a hardware resource associated with the physical machine 100, the virtual machine monitor 112 can receive the instruction and interact with the hardware resource on behalf of the virtual machine 114. As an example, if the side-channel attack 118 uses the READ_TSC instruction to read the clock 106, the virtual machine monitor 112 can receive the READ_TSC instruction (e.g., trap the READ_TSC instruction), perform its own READ_TSC instruction, receive the value from the CPU 102 and then provide the value to the side-channel attack 118.

Figure 2:
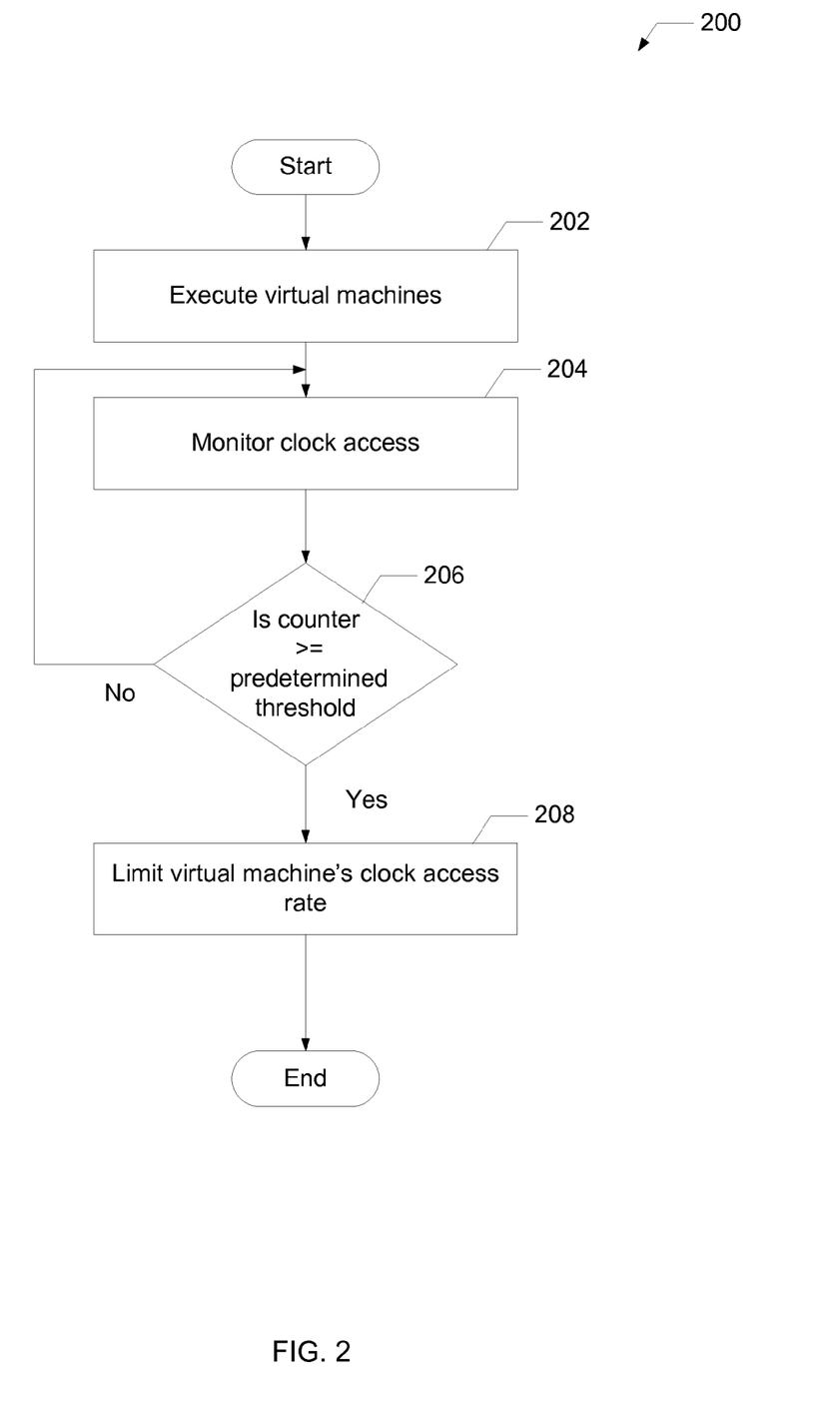
FIG. 2 is a flowchart of an example process for improving computer security.

FIG. 2 is a flowchart of an example process 200 for improving computer security. The process 200 begins by executing a set of virtual machines (at 202). For example, the physical machine 100 can host the virtual machines 114 and 116. Each of the virtual machines 114 and 116 can execute software applications. In some implementations, each virtual machine 114 and 116 can access the CPU 102 and other hardware resources for a limited amount of time (e.g., time sliced execution). By way of example, a slice can be 1 to 10 milliseconds in duration.

As each virtual machine is executed, the virtual machine monitor 112 monitors clock reads/accesses (at 204). For example, when a virtual machine 114 or 116 begins its execution in its respective time slice, the virtual machine monitor 112 can reset the counter 108 and monitor the number of times (or the rate at which) a process executed within the virtual machine 114 and 116 accesses/reads the clock (e.g., performs a READ_TSC operation). For example, the virtual machine monitor 112 can use an API associated with the CPU 102 and/or the operating system executed on the physical machine 100 to read the counter 108. In some implementations, the virtual machine monitor 112 continuously polls the counter 108 using the API. In some implementations, the virtual machine monitor 112 can periodically poll the counter 108 using the API. Each time the clock is read, the CPU 102 can increment the counter 108.

If the value of the counter 108 is less than a threshold (e.g., an access threshold) (at 206), the virtual machine monitor 112 continues to monitor the number of clock accesses or the rate of clock accesses (at 204). For example, the threshold can be a rate of 100 to 1000 times per second. Other threshold values are possible. In some implementations, profiling of a "typical" workload could be used to establish the threshold. If the value is greater than or equal to the threshold, the virtual machine monitor 112 can determine that the virtual machine 116 includes a malicious process (e.g., the side-channel attack 118) and can limit the virtual machine's ability to access the clock. For example, the virtual machine monitor 112 can decrease or limit the rate at which an application executing on the virtual machine can read the clock 106 by trapping the READ_TSC instruction (e.g., rate limiting or frequency limiting access to the clock). The virtual machine monitor 112 can rate limit the application's ability to access the clock 106 for the remainder of the time period the virtual machine is executed (e.g., the remainder of the time-slice). In some implementations, the virtual machine monitor 112 can prevent the virtual machine 116 from reading the clock 106. In some implementations, the virtual machine monitor 112 can continue to rate limit the application's ability to access the clock 106 in future time-slices. In some implementations, instead of rate limiting or frequency limiting the virtual machine's ability to access the clock, the virtual machine monitor 112 can trap the READ_TSC instruction and return a value corresponding to a less precise clock. For example, instead of returning a value corresponding to a counter that has a microsecond degree of accuracy, the virtual machine monitor 112 can return a value of a counter that has a ten millisecond degree of accuracy. Because some side-channel attacks rely on frequent clock accesses, the side-channel attack 118 can be thwarted because the side-channel attack 118 cannot access the clock 106 at a sufficient rate.

Figure 3:
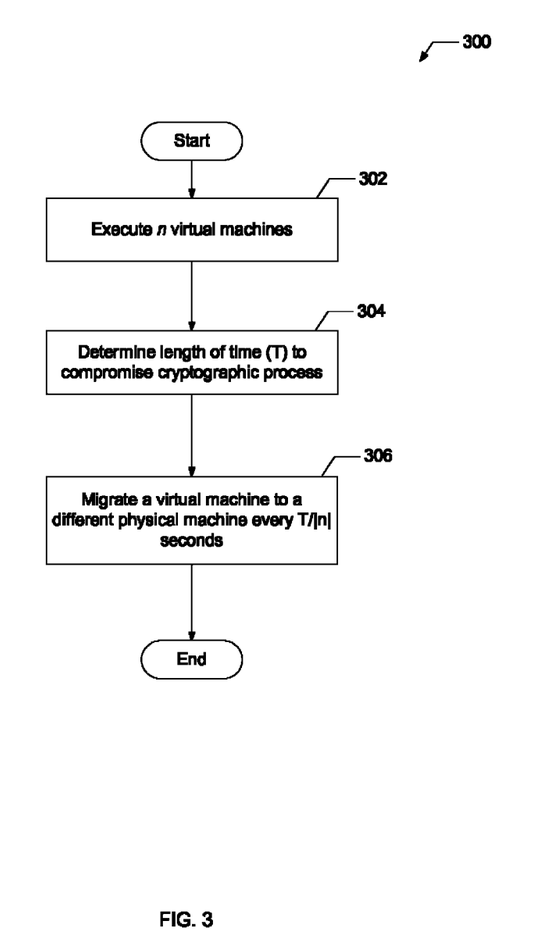
FIG. 3 is a flowchart of an example process for improving computer security.

FIG. 3 is a flowchart of an example process 300 for improving computer security. The process 300 begins by executing n virtual machines (at 302). For example, n virtual machines 114 and 116 can be hosted on a physical machine 100. In some implementations, each virtual machine 114 and 116 can access the CPU 102 and other hardware resources for a limited amount of time (e.g., time sliced execution). Each of the virtual machines 114 and 116 can execute one or more applications.

The length of time (T) to compromise an encryption algorithm executed in a virtual machine can be determined (at 304). For example, if the virtual machine 114 is executing a particular encryption algorithm (e.g., SSL), the virtual machine monitor 112 or an administrator/operator of the physical machine 100 can determine that the time T to compromise the encryption algorithm is equal to 5 minutes (i.e., T=300 seconds). In some implementations, the virtual machine monitor 112 or the administrator/operator of the physical machine 100 or system can access a database that provides estimates of the time necessary to compromise a particular encryption algorithm. The time necessary for the attack can also depend on the rate at which the encryption operation is being performed, the accuracy of the available clock (and how quickly it can be accessed), and the amount of background activity.

After determining the time to compromise the encryption algorithm, the virtual machine monitor can migrate each of the n virtual machines from the physical machine during the time T (at 306). For example, the virtual machine monitor 112 can migrate each of the n virtual machines from physical machine 100 to a different physical machine 100 (e.g., a destination physical machine) such that none of the n virtual machines 114 and 116 are executed on physical machine 100 for longer than T seconds (e.g., T-1 seconds, T/2 seconds, etc.) In some implementations, the virtual machine monitor 112 migrates a virtual machine 114 or 116 every T/n seconds. The virtual machine monitor 112 can migrate each of the virtual machines 114 or 116 to different destination physical machines. In some implementations, the virtual machine monitor 112 can check the processing load of a destination physical machine before migrating a virtual machine 114 or 116. In some implementations, the virtual machine monitor 112 will relocate a virtual machine to a destination physical machine if the processing load is less than a threshold (e.g., load threshold). Migrating each of the n virtual machines can reduce the likelihood that a side-channel attack 118 will be able to compromise the encryption algorithm because each time the virtual machine 116 executing the side-channel attack 118 is migrated, the data it has collected will be obsolete and will have to start collecting a new set of data. Although not illustrated in FIG. 3, virtual machines can be migrated from a different physical machine to the physical machine 100.

Figure 4:
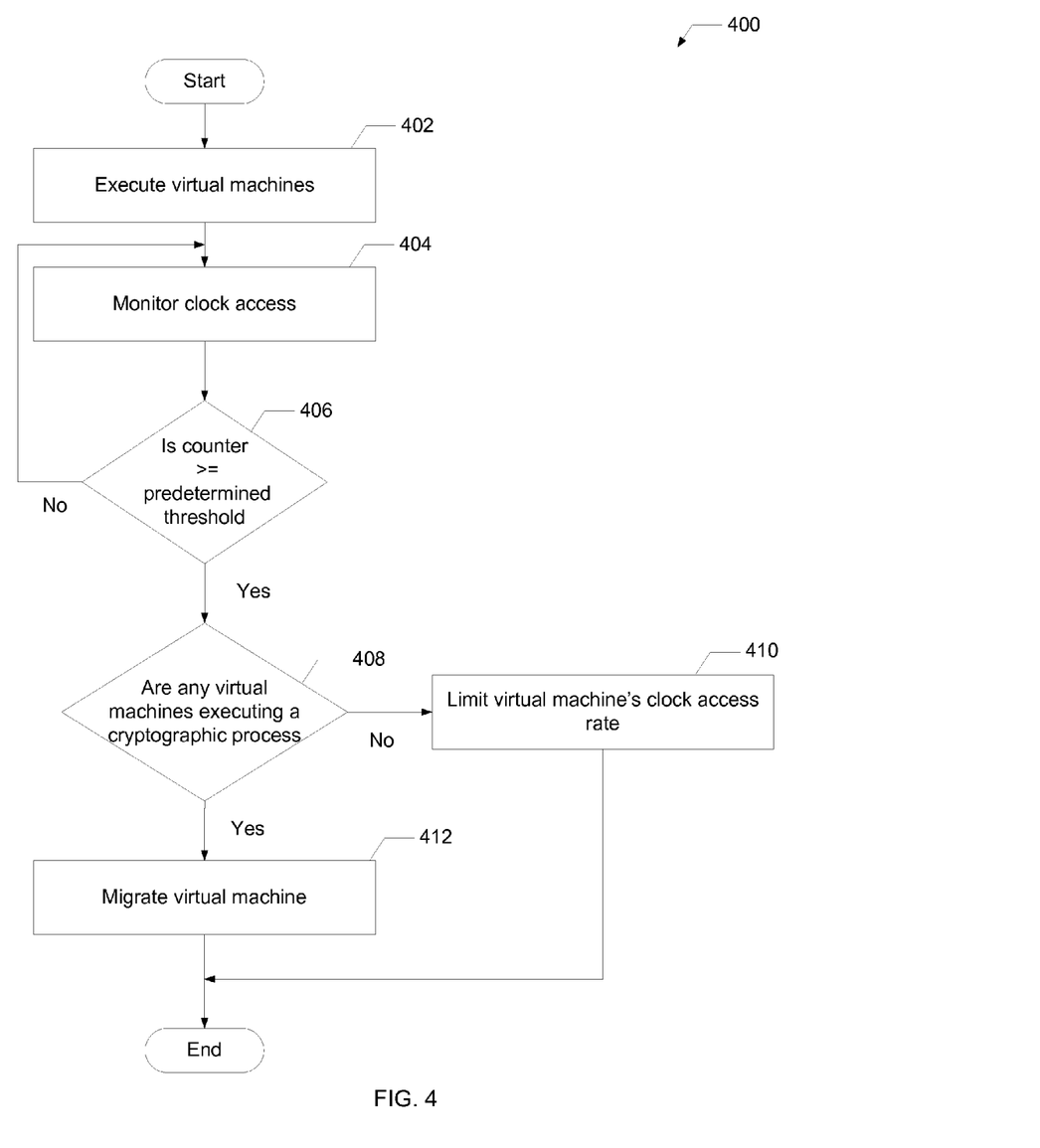
FIG. 4 is a flowchart of an example process for improving computer security.

FIG. 4 is a flowchart of an example process 400 for improving computer security. Process 400 begins by executing n virtual machines (at 402). For example, n virtual machines 114 and 116 and applications executed on the virtual machines 114 and 116 can be executed on a physical machine 100. Each virtual machine can access the CPU 102 and other hardware resources for a limited amount of time (e.g., time sliced execution).

As each virtual machine is executed, the virtual machine monitor 112 monitors accesses to the clocks (at 404). For example, when a virtual machine 114 or 116 begins its executing in its time slice, the virtual machine monitor 112 can reset the counter 108 and monitor the number of times (or rate at which) a process executed within the virtual machine reads the clock (e.g., performs a READ_TSC operation). Each time the clock is read, the CPU 102 can increment the counter 108. In some implementations, the virtual machine monitor 112 continuously polls the counter 108 or periodically polls the counter 108.

If the value of the counter 108 is less than a threshold (e.g., an access threshold) (at 406), the virtual machine monitor 112 continues to monitor clock accesses or the rate of clock access (at 404). For example, the threshold can be a rate of 100 to 1000 times per second. Other threshold values are possible. In some implementations, profiling of a "typical" workload could be used to establish the threshold. If the value is greater than or equal to the threshold (at 406), the virtual machine monitor 112 can determine that the virtual machine 116 includes a hostile application and can determine whether any of the virtual machines 114 hosted on the physical machine 100 are executing an encryption algorithm (at 408). For example, the virtual machine monitor 112 can access a configuration file associated with the virtual machine 116 that indicates whether any of the virtual machines 114 are configured to execute an encryption algorithm (e.g., the configuration file can include a token or string that indicates that an encryption algorithm can be performed or executed by one of the virtual machine 114). Alternatively, or in addition to, the virtual machine monitor 112 can determine whether any of the virtual machines 114 hosted on the physical machine 100 are executing an encryption algorithm by analyzing a list of virtual machines 114 that are executing an encryption algorithm. The virtual machine monitor 112 can generate the list by intercepting CPU instructions that are commonly used in or specifically designed for the execution of encryption algorithms during normal execution of the virtual machines 114 or by monitoring the virtual machines 114 access to a key repository or cryptographic device provided by the virtual machine monitor 112 during normal execution of the virtual machines 114. In some implementations, the virtual machine monitor 112 can suspend or terminate the virtual machine 116 after it determines that the virtual machine 116 includes the hostile application.

If the virtual machine monitor determines that none of the virtual machines 114 are executing an encryption algorithm (at 408), the virtual machine monitor 112 can limit the virtual machine's 116 ability to access the clock (at 410). For example, the virtual machine monitor 112 can limit the rate at which an application executing on the virtual machine 116 can read the clock 106 by trapping the READ_TSC instruction (e.g., rate limiting or frequency limiting access to the clock). The virtual machine monitor 112 can rate limit the application's ability to access the clock 106 for the remainder of the time period the virtual machine is executed (e.g., the remainder of the time-slice). In some implementations, the virtual machine monitor 112 can continue to rate limit the application's ability to read the clock 106 in future time-slices. In some implementations, if the virtual machine monitor 112 determines that none of the virtual machines 114 and 116 are executing an encryption algorithm, the virtual machine monitor 112 can continue monitoring clock accesses and not rate limit the virtual machine's ability to access the clock.

If the virtual machine monitor determines that at least one of the virtual machines are executing an encryption process (at 408), the virtual machine monitor can migrate a virtual machine (at 412). For example, the virtual machine monitor 112 can migrate the virtual machine 114 that is executing the encryption algorithm to a different physical machine (e.g., a physical machine that has not detected a hostile application). As another example, the virtual machine monitor 112 can migrate the virtual machine 116 that is hosting the side-channel attack 118 to a physical machine that is not executing any virtual machines performing encryption applications). In some implementations, the virtual machine monitor 112 can migrate each of the virtual machines 114 or 116 hosted on the physical machine 100 to different destination physical machines. In some implementations, the virtual machine monitor 112 can check the processing load of a destination physical machine before migrating a virtual machine 114 or 116. In some implementations, the virtual machine monitor 112 will relocate a virtual machine to a destination physical machine if the processing load is less than a threshold (e.g., a load threshold).

In some implementations, if the virtual machine monitor 112 determines that at least one of the virtual machines are executing an encryption process, the virtual machine monitor 112 can migrate each of the n virtual machines 114 hosted on the physical machine 100 as explained in connection with FIG. 3. For example, the virtual machine monitor 112 can determine the length of time (T) needed to compromise the encryption algorithm and migrate each of the n virtual machines from physical machine 100 to a different physical machine 100 such that none of the n virtual machines 114 and 116 are executed on the physical machine 100 for longer than T seconds.

Alternatively, or in addition to, if the virtual machine monitor 112 determines that at least one of the virtual machines is executing an encryption process, the virtual machine monitor 112 can suspend the virtual machine 116 that is hosting the side-channel attack 118 until the encryption algorithm is completed or can terminate the virtual machine 116 such that the virtual machine 116 and any processes executed by the virtual machine 116 are no longer executed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" can encompass apparatuses, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    executing a plurality of virtual machines on a first physical machine, wherein a first virtual machine of the plurality of virtual machines executes an encryption process;
    detecting, on a second virtual machine of the plurality of virtual machines, execution of a hostile process that is configured to compromise the encryption process executed by the first virtual machine, the detecting comprising:
        determining a count representing read accesses to a clock by the hostile process, wherein the clock is within a central processing unit of the physical machine;
        determining a rate of clock read accesses by the hostile process;
        determining whether the rate of clock read accesses is beyond a clock read access threshold; and
        detecting the execution of the hostile process based on the determination that the rate of clock read access is beyond the clock read access threshold; and
    migrating at least the second virtual machine from the first physical machine to a second physical machine based on the detection of the execution of the hostile process, wherein the second physical machine is separate and distinct from the first physical machine.

2. The computer-implemented method of claim 1 wherein migrating at least the second virtual machine further comprises migrating the first virtual machine to a third physical machine.

3. The computer-implemented method of claim 1 wherein migrating at least the second virtual machine further comprises migrating the first virtual machine to the second physical machine at a time instance that is different than a time instance of migrating the second virtual machine.

4. The computer-implemented method of claim 1 wherein the second physical machine is not hosting a virtual machine executing an encryption process.

5. The computer-implemented method of claim 1 wherein the hostile process is configured to monitor events associated with the first virtual machine to determine a cryptographic key associated with the encryption process.

6. The computer-implemented method of claim 5 wherein the events associated with the first virtual machine include cache accesses.

7. The computer-implemented method of claim 6 wherein the cache accesses are associated with a cache associated with the physical machine.

8. The computer-implemented method of claim 1 wherein the process configured to compromise the encryption process comprises a side-channel attack.

9. The computer-implemented method of claim 1 further comprising determining that a processing load associated with the second physical machine is less than a load threshold before migrating the second virtual machine.

10. A system comprising:
    a data processing apparatus configured to perform operations comprising:
        executing a plurality of virtual machines on a physical machine, wherein a first virtual machine of the plurality of virtual machines executes an encryption process;
        detecting, on a second virtual machine of the plurality of virtual machines, execution of a hostile process that is configured to compromise the encryption process executed by the first virtual machine, the detecting comprising:
            determining a count representing read accesses to a clock by the hostile process, wherein the clock is within a central processing unit of the physical machine;
            determining a rate of clock read accesses by the hostile process;
            determining whether the rate of clock read accesses is beyond a clock read access threshold; and
            detecting the execution of the hostile process based on the determination that the rate of clock read access is beyond the clock read access threshold; and
        migrating at least the second virtual machine from the first physical machine to a second physical machine based on the detection of the execution of the hostile process, wherein the second physical machine is separate and distinct from the first physical machine.

11. The system of claim 10 wherein the data processing apparatus and the second data processing apparatus are associated with a cloud computing system.

12. The system of claim 10 wherein migrating at least the second virtual machine further comprises migrating the first virtual machine to a third data processing apparatus.

13. The system of claim 10 wherein migrating at least the second virtual machine further comprises migrating the first virtual machine to the second physical machine at a time instance that is different than a time instance of migrating the second virtual machine.

14. The system of claim 10 wherein the second data processing apparatus is not hosting a virtual machine executing an encryption process.

15. The system of claim 10 wherein the hostile process is configured to monitor events associated with the first virtual machine to determine a cryptographic key associated with the encryption process.

16. The system of claim 15 wherein the events associated with the first virtual machine include cache accesses.

17. The system of claim 16 wherein the cache accesses are associated with a cache associated with the data processing apparatus.

18. The system of claim 10 wherein the process configured to compromise the encryption process comprises a side-channel attack.

19. The system of claim 10, wherein the operations further comprise determining that a processing load associated with the second data processing apparatus is less than a load threshold before migrating the second virtual machine.

20. A non-transitory computer storage medium having instructions stored thereon that, when executed by a data processing apparatus, cause the data processing apparatus to perform operations comprising:
   executing a plurality of virtual machines on a physical machine, wherein a first virtual machine of the plurality of virtual machines executes an encryption process;
   detecting, on a second virtual machine of the plurality of virtual machines, execution of a hostile process that is configured to compromise the encryption process executed by the first virtual machine, the detecting comprising:
      determining a count representing read accesses to a clock by the hostile process, wherein the clock is within a central processing unit of the physical machine;
      determining a rate of clock read accesses by the hostile process;
      determining whether the rate of clock read accesses is beyond a clock read access threshold; and
      detecting the execution of the hostile process based on the determination that the rate of clock read access is beyond the clock read access threshold; and
   migrating at least the second virtual machine from the first physical machine to a second physical machine based on the detection of the execution of the hostile process, wherein the second physical machine is separate and distinct from the first physical machine.

21. The non-transitory computer storage medium of claim 20 wherein migrating at least the second virtual machine further comprises migrating the first virtual machine to a third physical machine.

22. The non-transitory computer medium of claim 20 wherein migrating at least the second virtual machine further comprises migrating the first virtual machine to the second physical machine at a time instance that is different than a time instance of migrating the second virtual machine.

23. The non-transitory computer medium of claim 20 wherein the second physical machine is not hosting a virtual machine executing an encryption process.

24. The non-transitory computer medium of claim 20 wherein the hostile process is configured to monitor events associated with the first virtual machine to determine a cryptographic key associated with the encryption process.

25. The non-transitory computer medium of claim 24 wherein the events associated with the first virtual machine include cache accesses.

26. The non-transitory computer medium of claim 25 wherein the cache accesses are associated with a cache associated with the physical machine.

27. The non-transitory computer medium of claim 20 wherein the process configured to compromise the encryption process comprises a side-channel attack.

28. The non-transitory computer medium of claim 20 wherein the operations further comprise determining that a processing load associated with the second physical machine is less than a load threshold before migrating the second virtual machine.

* * * * *